United States Patent
Sato et al.

(10) Patent No.: US 11,625,220 B2
(45) Date of Patent: Apr. 11, 2023

(54) DIGITAL MIXER HAVING PLURALITY OF DISPLAYS

(71) Applicant: TEAC CORPORATION, Tokyo (JP)

(72) Inventors: Dai Sato, Tama (JP); Kazuhiko Endo, Tama (JP); Daisuke Mitomi, Tama (JP); Paul Youngblood, Santa Fe Springs, CA (US)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 17/406,999

(22) Filed: Aug. 19, 2021

(65) Prior Publication Data

US 2022/0147310 A1 May 12, 2022

Related U.S. Application Data

(60) Provisional application No. 63/112,428, filed on Nov. 11, 2020.

(51) Int. Cl.
  *G06F 3/16* (2006.01)
  *G06F 3/04847* (2022.01)
  *G06F 3/14* (2006.01)

(52) U.S. Cl.
  CPC .......... *G06F 3/165* (2013.01); *G06F 3/04847* (2013.01); *G06F 3/1446* (2013.01)

(58) Field of Classification Search
  CPC ..... G06F 3/165; G06F 3/04847; G06F 3/1446
  See application file for complete search history.

(56) References Cited

U.S. PATENT DOCUMENTS

| | | | |
|---|---|---|---|
| 10,048,928 B2* | 8/2018 | Heiniger | G06F 3/165 |
| 2005/0256595 A1* | 11/2005 | Aiso | H04H 60/04 |
| | | | 381/119 |
| 2010/0239107 A1 | 9/2010 | Fujita et al. | |

(Continued)

FOREIGN PATENT DOCUMENTS

| | | | |
|---|---|---|---|
| JP | 2010-226262 A | 10/2010 | |
| JP | 2010-226264 A | 10/2010 | |

(Continued)

OTHER PUBLICATIONS

Extended European Search Report, dated Mar. 22, 2022, for European Application No. 21205962.0-1207, 7 pages.

(Continued)

*Primary Examiner* — James T Tsai
(74) *Attorney, Agent, or Firm* — Seed IP Law Group LLP

(57) ABSTRACT

A digital mixer is disclosed having a plurality of displays and which applies a mixing process on an audio signal. The digital mixer includes an input interface, one or more processors, an output interface, at least a first display and a second display, and an operator. The operator includes a mode switching button for switching between a first mode and a second mode. The one or more processors are configured to cause parameter setting screens of audio signals of different channels to be displayed respectively on the first display and the second display when the mode switching button is set to the first mode, and cause different parameter setting screens of an audio signal of a single channel to be displayed respectively on the first display and the second display when the mode switching button is set to the second mode.

8 Claims, 15 Drawing Sheets

(56) References Cited

U.S. PATENT DOCUMENTS

| | | | |
|---|---|---|---|
| 2010/0251168 A1* | 9/2010 | Fujita | G06F 3/0488 |
| | | | 715/781 |
| 2011/0009990 A1* | 1/2011 | Terada | H04H 60/04 |
| | | | 700/94 |
| 2012/0023406 A1* | 1/2012 | Fujita | H04H 60/04 |
| | | | 715/727 |
| 2014/0254834 A1 | 9/2014 | Umeo | |
| 2016/0283188 A1* | 9/2016 | Terada | H04H 60/04 |
| 2020/0192719 A1* | 6/2020 | Wilson | H04M 1/72454 |
| 2021/0286583 A1* | 9/2021 | Saito | G06F 3/165 |

FOREIGN PATENT DOCUMENTS

| | | |
|---|---|---|
| JP | 2011-199609 A | 10/2011 |
| JP | 5163567 B2 | 3/2013 |
| JP | 2013-110541 A | 6/2013 |
| JP | 5338412 B2 | 11/2013 |
| JP | 2016-40964 A | 3/2016 |
| JP | 5961980 B2 | 8/2016 |
| JP | 6057195 B2 | 1/2017 |

OTHER PUBLICATIONS

Yamaha, "Digital Mixing Console CL5 CL3 CL1 Owner's Manual," 2013, 65 pages.

* cited by examiner

US 11,625,220 B2

DIGITAL MIXER HAVING PLURALITY OF DISPLAYS

TECHNICAL FIELD

The present disclosure relates to a digital mixer having a plurality of displays, and which applies a mixing process of audio signals, and to a mixing console.

BACKGROUND

In a digital mixer, a plurality of channels and a plurality of parameters are present.

In general, of these parameters, a parameter selected by the user is displayed on one display screen, and the parameter is operated or changed. For example:
- an input level setting screen of a certain channel is displayed on a display screen, and is operated or changed;
- an equalizing (EQ) setting screen of a certain channel is displayed on the display screen, and is operated or changed; or
- a compressor setting screen of a certain channel is displayed on the display screen, and is operated or changed.

JP 2013-110541 A and JP 2016-40964 A disclose a technique in an acoustic signal processing apparatus, in which, from a screen displaying a parameter setting status of multiple channels, a parameter editing screen is opened for channel one or channel two with a simple operation, and the parameter editing screens are switched.

JP 2010-226264 A and JP 2010-226262 A disclose a technique in which left and right displays are provided between a lower group of channel strips and an upper group of channel strips, and parameters of one of the upper or lower group of channel strips are displayed in a switching manner.

In a user operation of a digital mixer, there exist needs for simultaneously operating or changing a plurality of parameters, such as:
- operating equalizing (EQ) simultaneously with operation of the input level;
- operating a compressor simultaneously with operation of the equalizing (EQ); or
- operating a parameter of another channel simultaneously with operation of a parameter of a certain channel.

An advantage of the present disclosure lies in provision of a digital mixer which enables simultaneous display, operation, or change of a plurality of channels or a plurality of parameters.

SUMMARY

According to one aspect of the present disclosure, there is provided a digital mixer comprising: an input interface; one or more processors; an output interface; at least a first display and a second display; and an operator. The operator includes a mode switching button for switching between a first mode and a second mode, and the one or more processors are configured, by reading and executing a program, to: cause parameter setting screens of audio signals of different channels to be displayed respectively on the first display and the second display when the mode switching button is set to the first mode; cause different parameter setting screens of an audio signal of a single channel to be displayed respectively on the first display and the second display when the mode switching button is set to the second mode; and process an audio signal which is input from the input interface using a parameter which is set in the parameter setting screen, and output the processed signal from the output interface.

The digital mixer includes a mixing console.

According to another aspect of the present disclosure, the one or more processors are configured, by reading and executing the program, to: cause a state of an audio signal assigned to a certain channel strip to be displayed on the first display and cause a state of another audio signal assigned to another channel strip to be displayed on the second display when the mode switching button is set to the first mode; and cause a state of an audio signal assigned to a single channel strip to be displayed on the first display and the second display when the mode switching button is set to the second mode.

According to another aspect of the present disclosure, the first mode is a normal mode and the second mode is a full-screen mode, the mode switching button is set to the normal mode in a default state, and the one or more processors are configured, by reading and executing the program, to: cause a home screen to be displayed on the first display and the second display; and cause parameter setting screens of audio signals of different channels to be displayed respectively on the first display and the second display when a user operation of parameter setting is performed and the mode switching button is not operated, and cause different parameter setting screens of an audio signal of a single channel to be displayed respectively on the first display and the second display when the user operation of parameter setting is performed and the mode switching button is operated to an ON state.

According to another aspect of the present disclosure, the one or more processors are configured, by executing the program, to: store in a memory a combination of different parameters of an audio signal of a single channel to be displayed on the first display and the second display in the second mode.

According to another aspect of the present disclosure, the mode switching button is displayed as a touch button on the first display and the second display, displays a current mode state, and enables switching between the first mode and the second mode at an arbitrary timing.

BRIEF DESCRIPTION OF DRAWINGS

Embodiment(s) of the present disclosure will be described based on the following figures, wherein.

DESCRIPTION OF EMBODIMENTS

The present disclosure will now be described with reference to the attached drawings.

Figure 1:
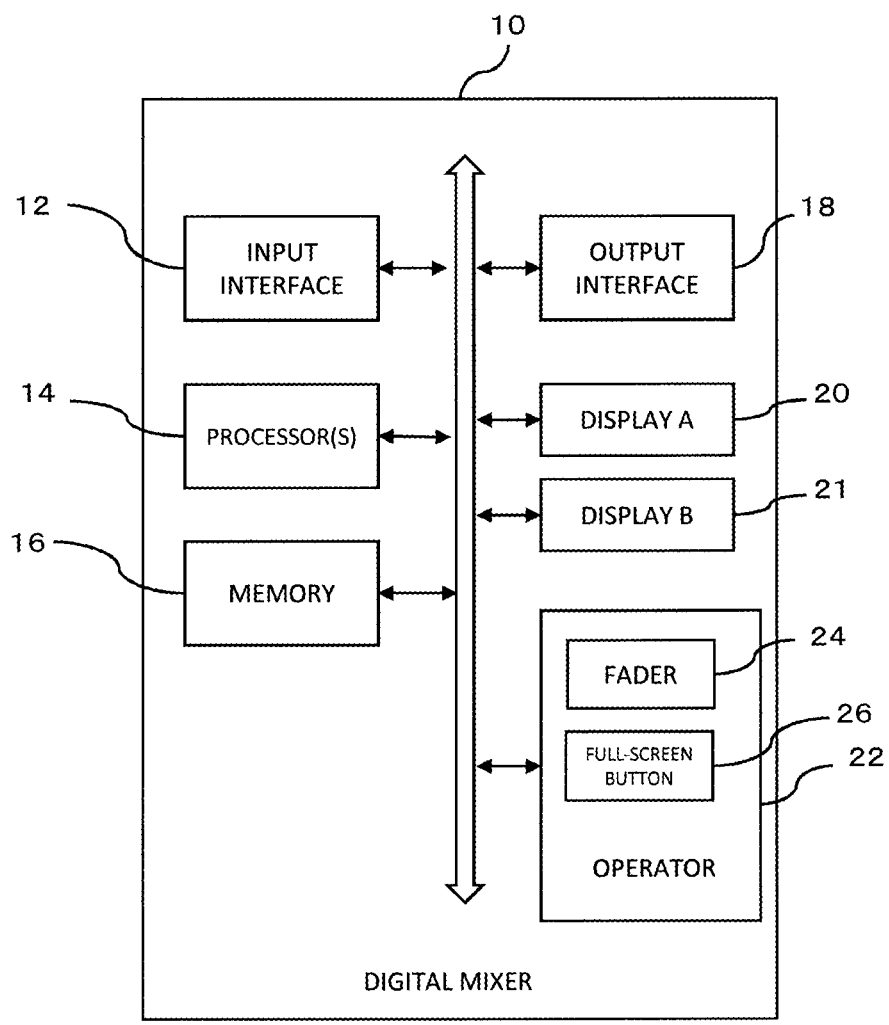
FIG. 1 is a structural block diagram of a digital mixer.

FIG. 1 is a structural block diagram of a digital mixer (or a mixing console) according to an embodiment of the present disclosure. A digital mixer 10 applies various processes on various input audio signals, such as routing, assignment, equalizing, mixing, and effect, and outputs the processed signal to the outside.

The digital mixer 10 comprises an input interface 12, one or more processors 14, a memory 16, an output interface 18, a display A 20, a display B 21, and an operator 22. The operator 22 includes a fader 24, and a full-screen button 26. In the present disclosure, two displays, the display A 20 and the display B 21, are exemplified as the plurality of displays, but the present disclosure is not limited to such a configuration, and three or more displays may be employed as necessary.

The input interface 12 has an analog signal input terminal, a digital signal input terminal, and an ADC (analog-to-digital converter). An analog audio signal is converted into a digital audio signal by the ADC, and is input.

The one or more processors 14 are formed from a CPU or the like, and execute various processes by reading and executing a process program stored in the memory 16.

The display A 20 and the display B 21 display various states of the digital mixer 10. Each of the display A 20 and the display B 21 is formed from, for example, a liquid crystal panel, an organic EL panel, or the like.

The operator 22 is a group of switches and buttons operated by a user for executing various processes on the input audio signal. Alternatively, the display A 20 and the display B 21 may be formed by touch panels, and the operator 22 may be displayed on the touch panel, to enable a touch operation, or the operator 22 may be physical switches, buttons, knobs, or the like. The operator 22 includes the fader 24 and the full-screen button 26. The fader 24 executes level adjustment of an input and an output of the audio signal assigned to a channel strip, and includes a linear fader and a rotary fader. The channel strip is a unit of a collective structure including the fader, the knob, the switch, or the like, for adjusting an audio signal of a certain channel. The full-screen button 26 is operated to display, when various states of an audio signal assigned to a certain channel strip are displayed, the state of the audio signal assigned to the channel strip on both the display A 20 and the display B 21. The full-screen button 26 functions as a mode switching button for switching between two display modes.

Specifically, when the full-screen button 26 is not operated to the ON state, a state of an audio signal assigned to a certain channel strip is displayed on the display A 20, and a state of another audio signal assigned to another channel strip is displayed on the display B 21. On the other hand, when the full-screen button 26 is operated to the ON state, the state of the audio signal assigned to a certain channel strip is displayed on both the display A 20 and the display B 21.

The one or more processors 14 process the audio signal according to the operations of the fader 24, the full-screen button 26, or the like included in the operator 22. Various parameter values which are set by operating the operator 22 are stored in the memory 16 formed from a flash memory or the like. Various signal processes executed by the digital mixer 10 are executed according to the parameter value stored in the memory 16.

The one or more processors 14 may include a CPU which controls an overall operation of the digital mixer 10, and a DSP which executes various processes on the audio signal such as an input level adjustment, a gate process, an equalizing process, a compression process, a mixing process, an effect process, or the like by executing a process program based on an instruction of the CPU.

The DSP connects the input signal to an input channel. A number of input channels is arbitrary, and, for example, there may be 20 channels consisting of ch1~ch20. In each input channel, processes such as the level control, the gate process, the equalizing process, the compression process, and the like are executed according to the parameter value which is set. The audio signal of each input channel is selectively output to a mix (MIX) bus, and audio signals which are input from the input channels are mixed on the MIX bus. The level of the audio signal which is output from the input channel to the MIX bus may be adjusted. The mixed audio signal is output to an output channel. A number of the output channels is also arbitrary, and, for example, there may be 10 channels including MIX1~MIX10. On the output channels, various processes on the output side may be executed according to the parameter value which is set. An output signal from the output channel is output to the output interface 18.

The output interface 18 has an analog output terminal, a digital output terminal, and a DAC (digital-to-analog converter). The processed digital audio signal is converted into an analog audio signal by the DAC and is output.

Figure 2:
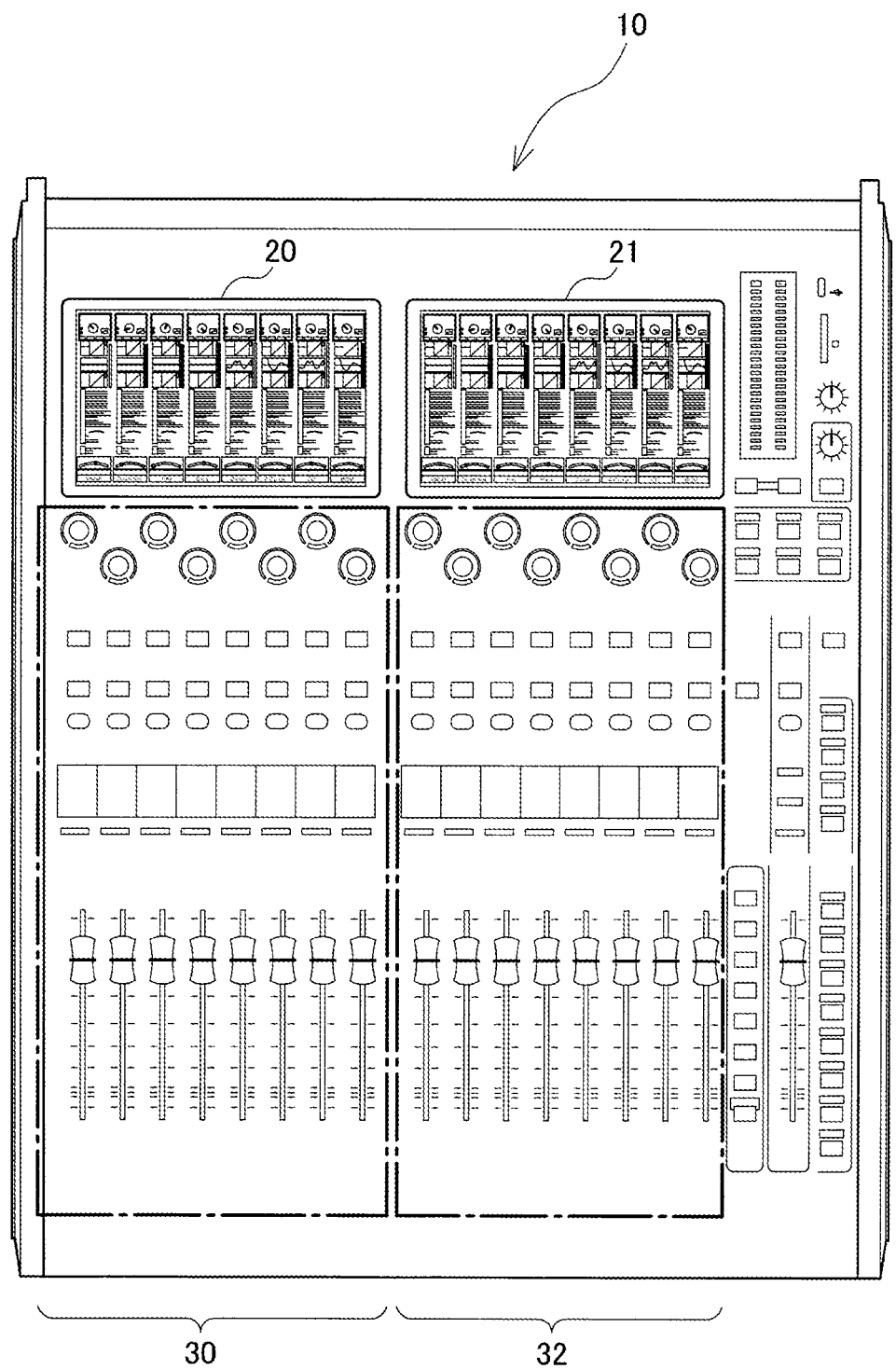
FIG. 2 is a diagram showing an outer appearance of a digital mixer.

FIG. 2 is a diagram showing an outer appearance of the digital mixer 10.

At an approximate center portion of the digital mixer 10, a plurality of channel strips which are long in a vertical direction are provided. A channel strip portion formed from a plurality of (in the figures, a total of 16) channel strips is divided into a plurality of blocks. In FIG. 2, 8 channel strips are provided in a left-side block 30 shown with a dot-and-chain line, and 8 channel strips are also provided on a right-side block 32 shown with a dot-and-chain line. In one channel strip, a rotary encoder, various buttons, and the fader (electric fader) 24 are placed as the operator 22. The display A 20 is provided at an upper portion of the left-side block 30, and the display B 21 is placed at an upper part of the right-side block 32. Basically, states of audio signals assigned to the 8 channel strips of the left-side block 30 are displayed on the display A 20, and states of audio signals assigned to the 8 channel strips of the right-side block 32 are displayed on the display B 21. Note that this will not be the case when the full-screen button 26 is operated to the ON state. That is, when the full-screen button 26 is operated to the ON state, a setting situation of a certain parameter of the audio signal assigned to one of the 8 channel strips of the left-side block 30 is displayed on the display A 20, and a setting situation of a different parameter of the same audio signal as the left side is displayed on the display B 21.

Alternatively, a certain state of an audio signal assigned to one of the 8 channel strips of the right-side block 32 is displayed on the display A 20, and a different state of the same audio signal as the left side is displayed on the display B 21.

On a right side of the digital mixer 10, various buttons are provided as the operator 22.

Figure 3:
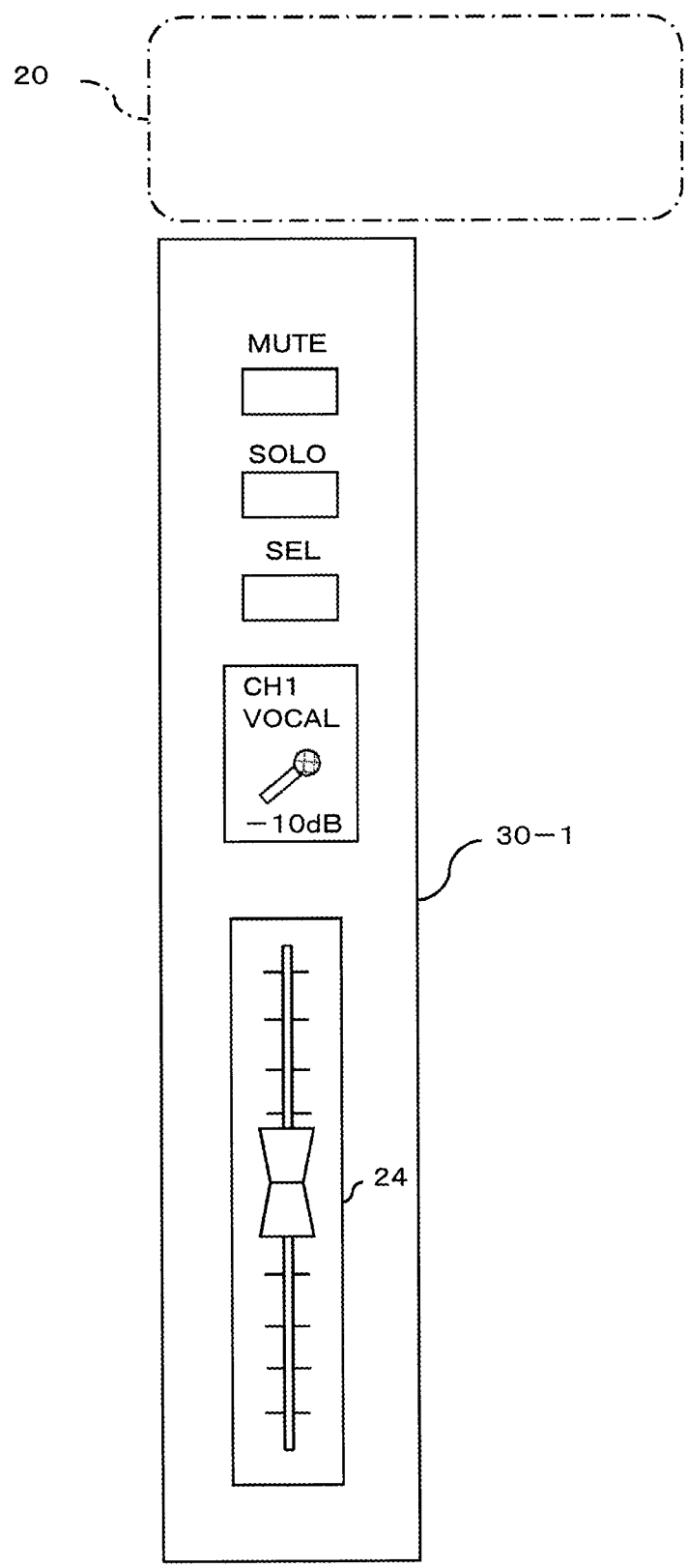
FIG. 3 is a schematic diagram of one channel strip of a left-side block.

FIG. 3 schematically shows one channel strip 30-1 of the left-side block 30.

The channel strip 30-1 includes a mute (MUTE) button, a solo (SOLO) button, a selection (SEL) button, a channel screen, and a fader (electric fader) 24. The SEL button is a button operated by the user for selecting a desired channel strip. When the user operates the SEL button, the one or more processors 14 cause a parameter setting screen of the channel strip to be displayed on the display A 20 or the display B 21.

The SOLO button and the MUTE button are known in the field. Briefly, the SOLO button is a button operated by the user for setting a desired channel strip to a solo state. The SOLO button is, for example, a toggle button, and the solo state/a released state are switched with an ON/OFF operation. The MUTE button is a button operated by the user for setting a desired channel strip to a no-sound state. The MUTE button is also a toggle button, for example, and the no-sound state/a released state are switched with an ON/OFF operation.

The channel screen displays a current setting state of the channel strip 30-1. The current setting state is, for example, a channel name which is set by the user, an icon which is set by the user, a setting value of the fader 24, or the like. In the figures, the channel strip 30-1 is ch1, vocal (VOCAL) is set in this channel as a channel name which is set by the user, and an icon of the vocal (icon of a microphone) is displayed. In addition, as the current setting value of the fader 24, "−10 dB" is displayed. When the user operates the fader 24, the display changes according to the operation value.

The fader (electric fader) 24 is a linear fader, and the user operates the fader up and down, to adjust a level of the audio signal assigned to ch1 (in this case, a vocal signal).

Figure 4:
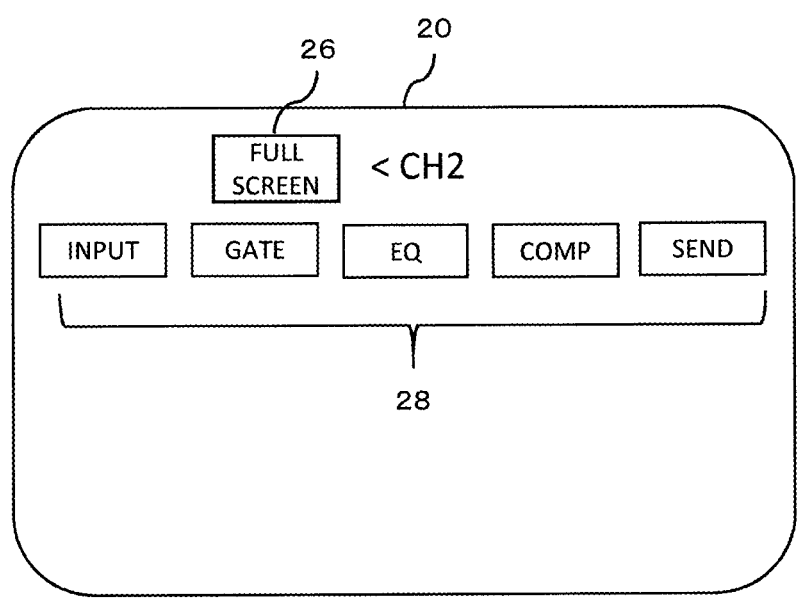
FIG. 4 is a diagram showing an example screen of a display.

FIG. 4 shows an example screen of the display A 20. The display A 20 basically displays states of audio signals assigned to the channel strips of the left-side block 30. FIG. 4 shows, as an example, a display of a state of an audio signal assigned to CH2. At an upper part of the screen, the full-screen button 26 is displayed, and a menu 28 of processes to be executed on the audio signal of CH2 is displayed. As the process menu, there are displayed "INPUT" for adjusting the input level, "GATE" for executing the gate process, "EQ" for executing the equalizing process, "COMP" for executing the compression process, "SEND" for sending the signal to an outside connection device, and the like. Alternatively, other, arbitrary processes may be included, such as, for example, a function to automatically reduce a level of a BGM when there is a microphone input upon use of the microphone while replaying the BGM or the like. When the user operates, for example, "INPUT", the screen of the display A 20 is switched to a screen for setting an input level parameter of the audio signal assigned to CH2. Alternatively, when the user operates, for example, "GATE", the screen of the display A 20 is switched to a screen for setting a gate parameter of the audio signal assigned to CH2. An example of a gate parameter is a threshold for the gate process. In the case where the full-screen button 26 is not operated to the ON state, the display A 20 and the display B 21 do not cooperate, and operate independently from each other. Thus, the switching of the screen of the display A 20 does not affect the screen of the display B 21.

Figure 5:
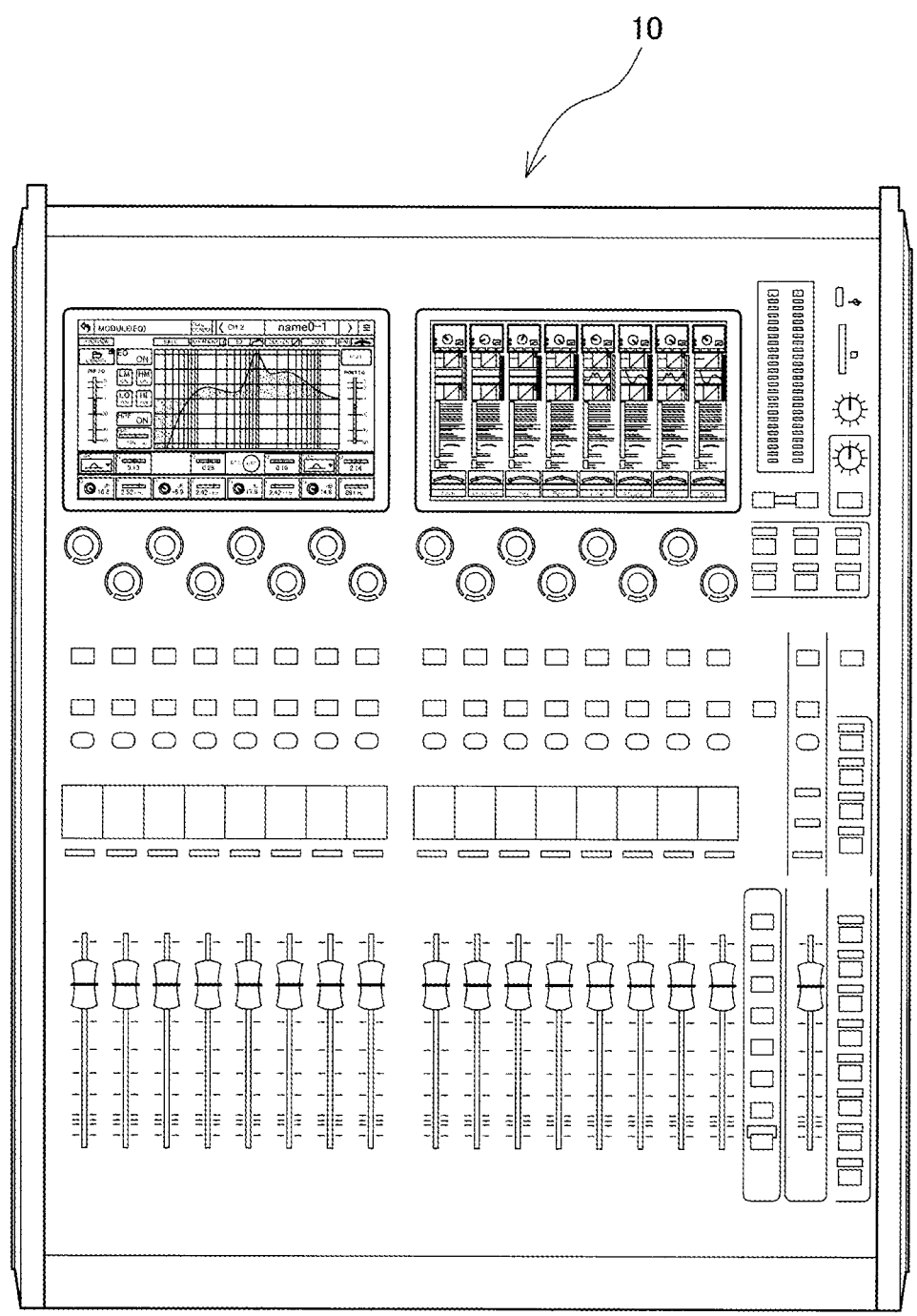
FIG. 5 is diagram showing an example display on a display of a digital mixer when a full-screen button is operated to an OFF state.

FIG. 5 shows example displays on the display A 20 and the display B 21 of the digital mixer 10 when the full-screen button 26 is operated to the OFF state. A parameter setting screen for the equalizing process of the audio signal assigned to a channel strip of the left-side block 30, for example, CH2, is displayed on the display A 20. The parameter of the equalizing process includes a frequency of an HPF (high-pass filter), a frequency of an LPF (low-pass filter), ON/OFF of control of LO (low sound range), ON/OFF of control of LM (low-middle sound range), ON/OFF of control of HM (high-middle sound range), ON/OFF of control of HI (high sound range), and the like. States of all audio signals assigned to the channel strips of the right-side block 32 are displayed on the display B 21. This screen is called a home screen. In the home screen, input levels and operation states of various processes; that is, the operation states of the gate process, the equalizing process, the compression process, and the like, of the audio signals assigned to a total of 8 channel strips are displayed.

Figure 6:
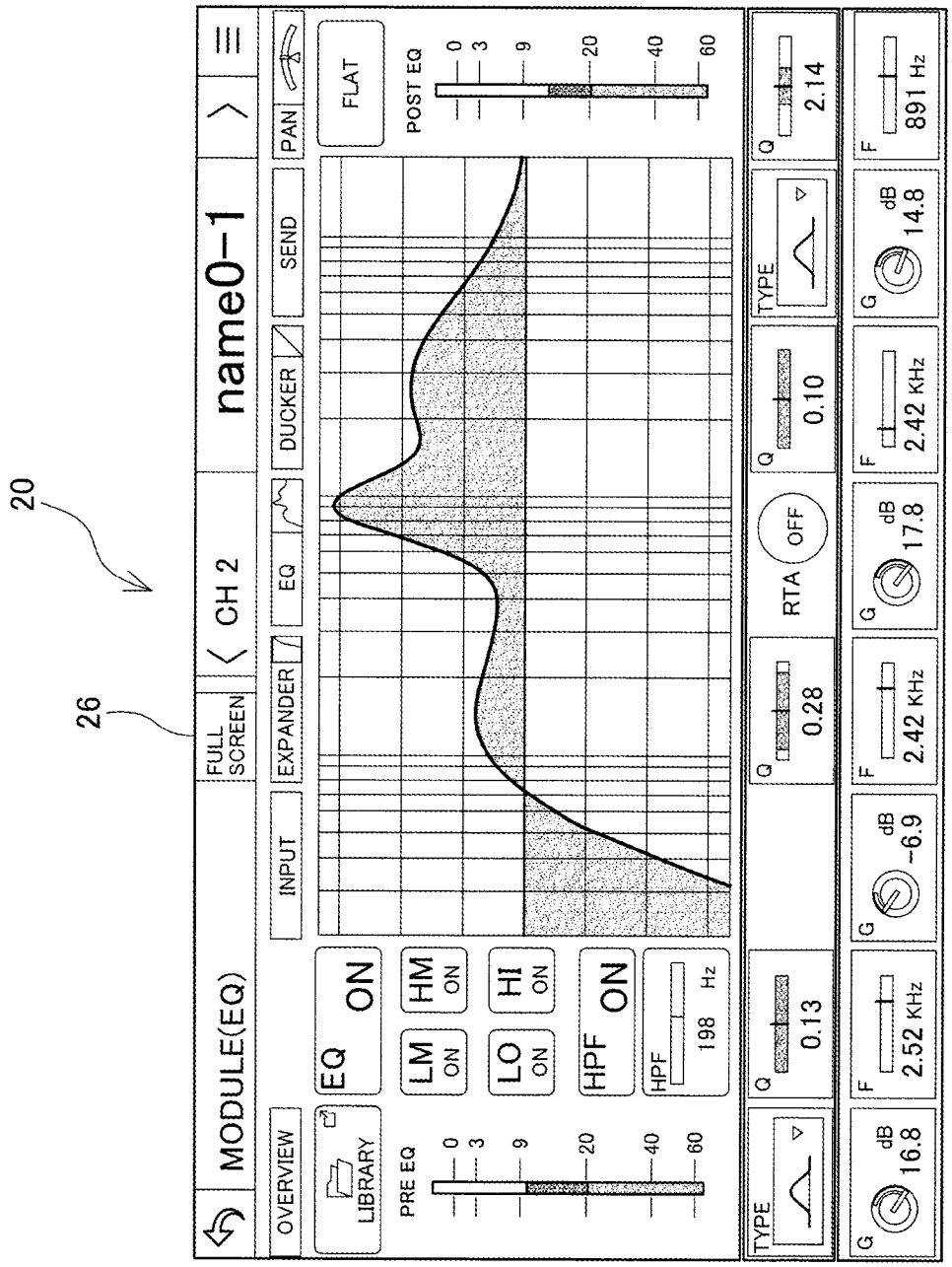
FIG. 6 is an enlarged view of the display of FIG. 5.

FIG. 6 is an enlarged view of the display A 20 shown in FIG. 5. This screen is a parameter setting screen for the equalizing process (EQ) of the audio signal assigned to CH2, and ON/OFF buttons, frequency setting buttons, or the like for various parameters are displayed. In addition, at the upper part of the screen, the full-screen button 26 is displayed. The user may set a desired equalizing process using the parameter setting screen.

Figure 7:
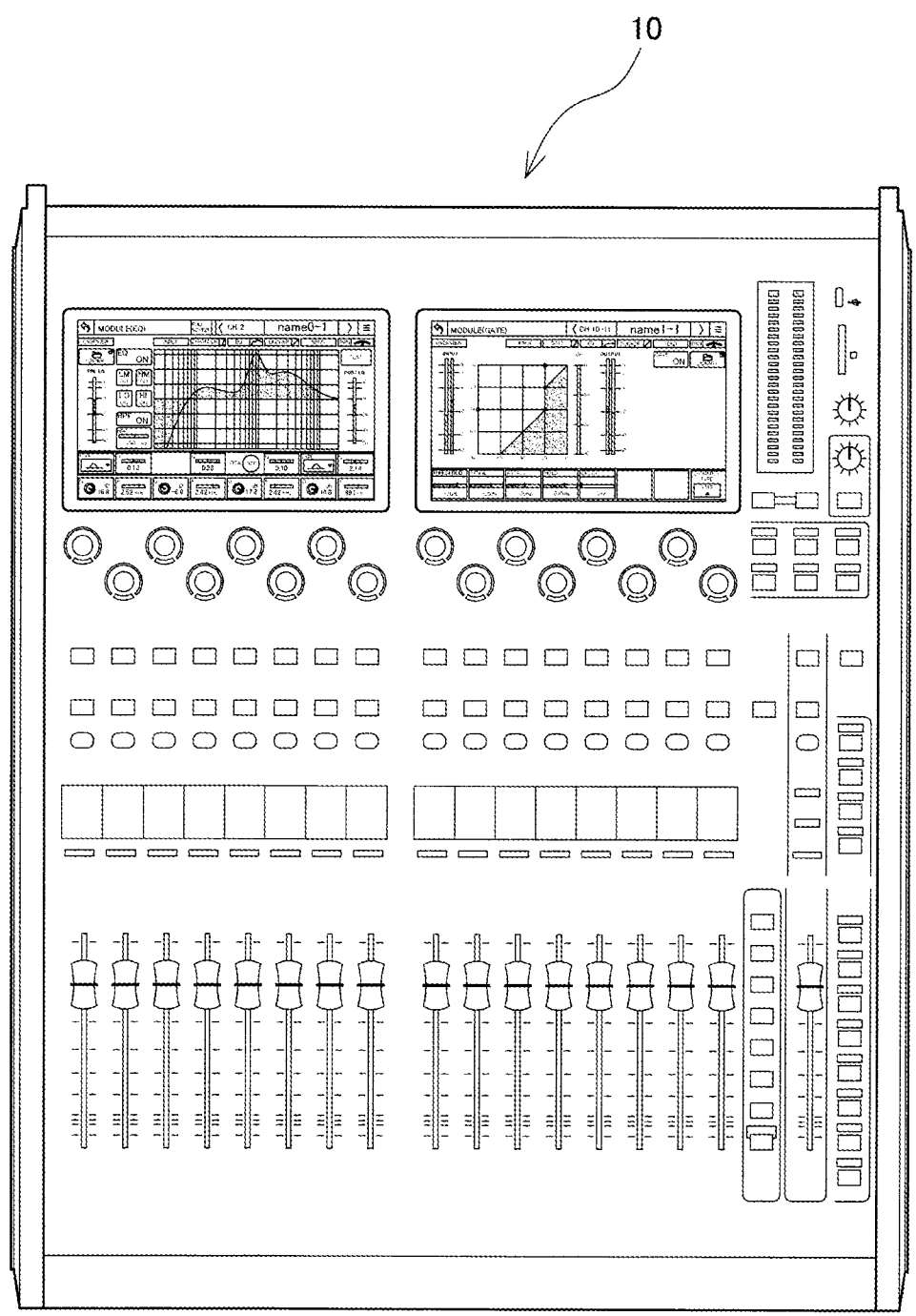
FIG. 7 is a diagram showing an example display when a user operates an operator from the screen of FIG. 5 to switch a screen of a display to a parameter setting screen of an audio signal assigned to a channel strip of a right-side block.

FIG. 7 shows an example display in which the user operates the operator 22 on the screen of FIG. 5, to switch the screen of the display B 21 to a parameter setting screen of an audio signal assigned to one of the channel strips of the right-side block 32. A parameter setting screen of a process for the audio signal assigned to the channel strip of the right-side block 32, for example, the gate process, is displayed on the display B 21.

Figure 8:
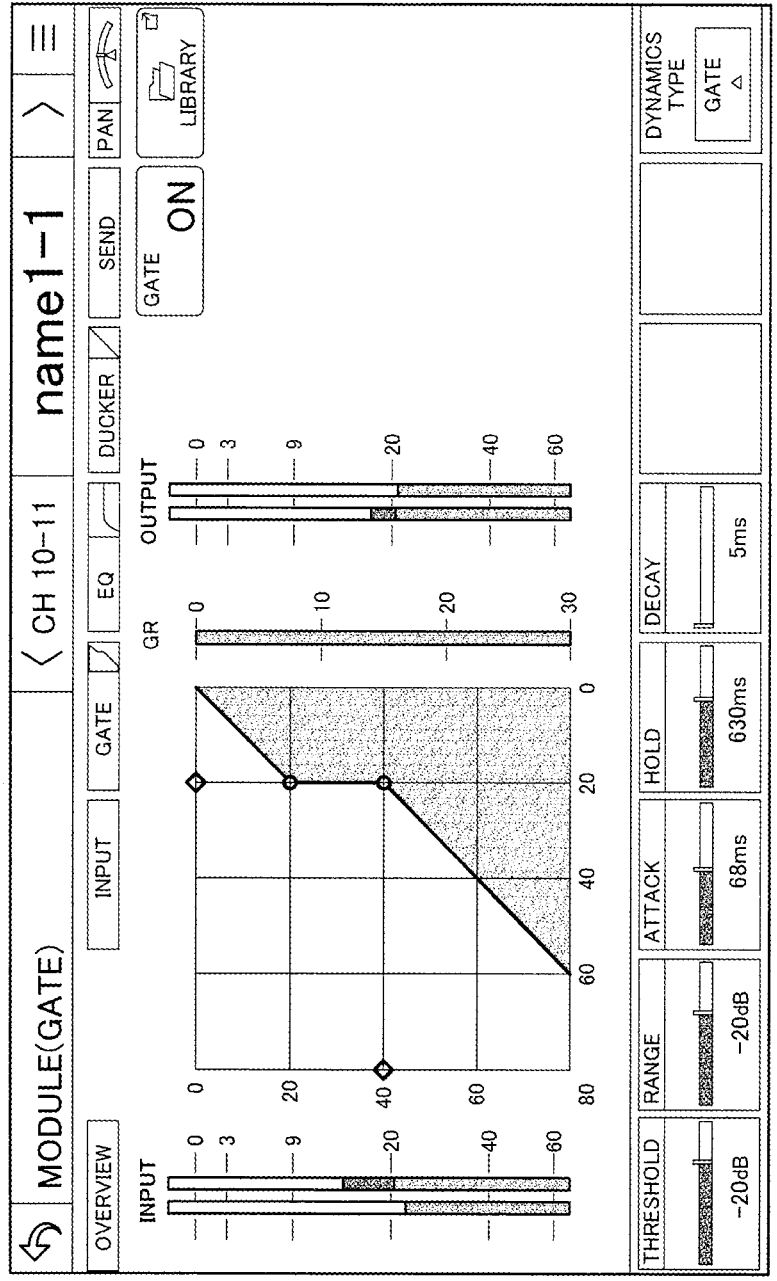
FIG. 8 is an enlarged view of the display of FIG. 7.

FIG. 8 is an enlarged view of the display B 21 of FIG. 7. This screen is a parameter setting screen of the gate process of the audio signals assigned to CH10-11, and adjustment bars for the input level, the output level, the threshold, the range, attack, or the like are displayed. The ATTACK refers to a period from an instant when the threshold is exceeded until the gate is completely open.

As shown in FIGS. 6, 7, and 8, when the full-screen button 26 is not operated to the ON state, the home screen or the parameter setting screen for the audio signal assigned to the channel strip of the left-side block 30 is displayed on the display A 20, and the home screen or the parameter setting screen for the audio signal assigned to the channel strip of the right-side block 32 is displayed on the display B 21. However, when the user operates the full-screen button 26, a parameter setting screen for the same audio signal is displayed on both the display A 20 and the display B 21. More specifically, while FIG. 7 shows that the parameter setting screen of the equalizing process of the audio signal of CH2 is displayed on the display A 20 and the parameter setting screen of the gate process of the audio signals of CH10-11 is displayed on the display B 21, when the user operates the full-screen button 26 displayed on the upper part of the parameter setting screen displayed on the display A 20 to the ON state, the screen of the display A 20 is maintained, and the screen of the display B 21 is switched from the parameter setting screen of the gate process of the audio signals of CH10-11 to a parameter setting screen of the audio signal of CH2. The parameter setting screen of CH2 displayed on the display B 21 may be an arbitrary screen of the parameter setting screen of CH2, but desirably, the parameter setting screen is a parameter setting screen for a parameter other than the parameter displayed on the display A 20. For example, when the parameter setting screen of the equalizing process of the audio signal of CH2 is displayed on the display A 20, a parameter setting screen for a process other than the equalizing process, such as the input level, the gate process, the compression process, or the like, may be displayed on the display B 21. Alternatively, a parameter setting screen to be displayed as a default when the full-screen button 26 is operated to the ON state may be determined in advance. Alternatively, the user may set and store in the memory 16 which parameter setting screen is to be displayed when the full-screen button 26 is operated to the ON state. Alternatively, a parameter setting screen which was displayed when the full-screen button 26 was previously operated to the ON state may be stored in the memory 16, and the parameter setting screen similar to the parameter setting screen previously displayed may be read and again displayed. For example, when the parameter setting screen of the equalizing process was displayed on the display A 20 and the parameter setting screen for the compression process (COMP) was displayed on the display B 21 at the previous operation of the full-screen button 26 to the ON state, the parameter setting screen of the compression process may be displayed on the display B 21 if the parameter setting screen of the equalizing process is displayed on the display A 20 at the current operation of the full-screen button 26 to the ON state.

Figure 9:
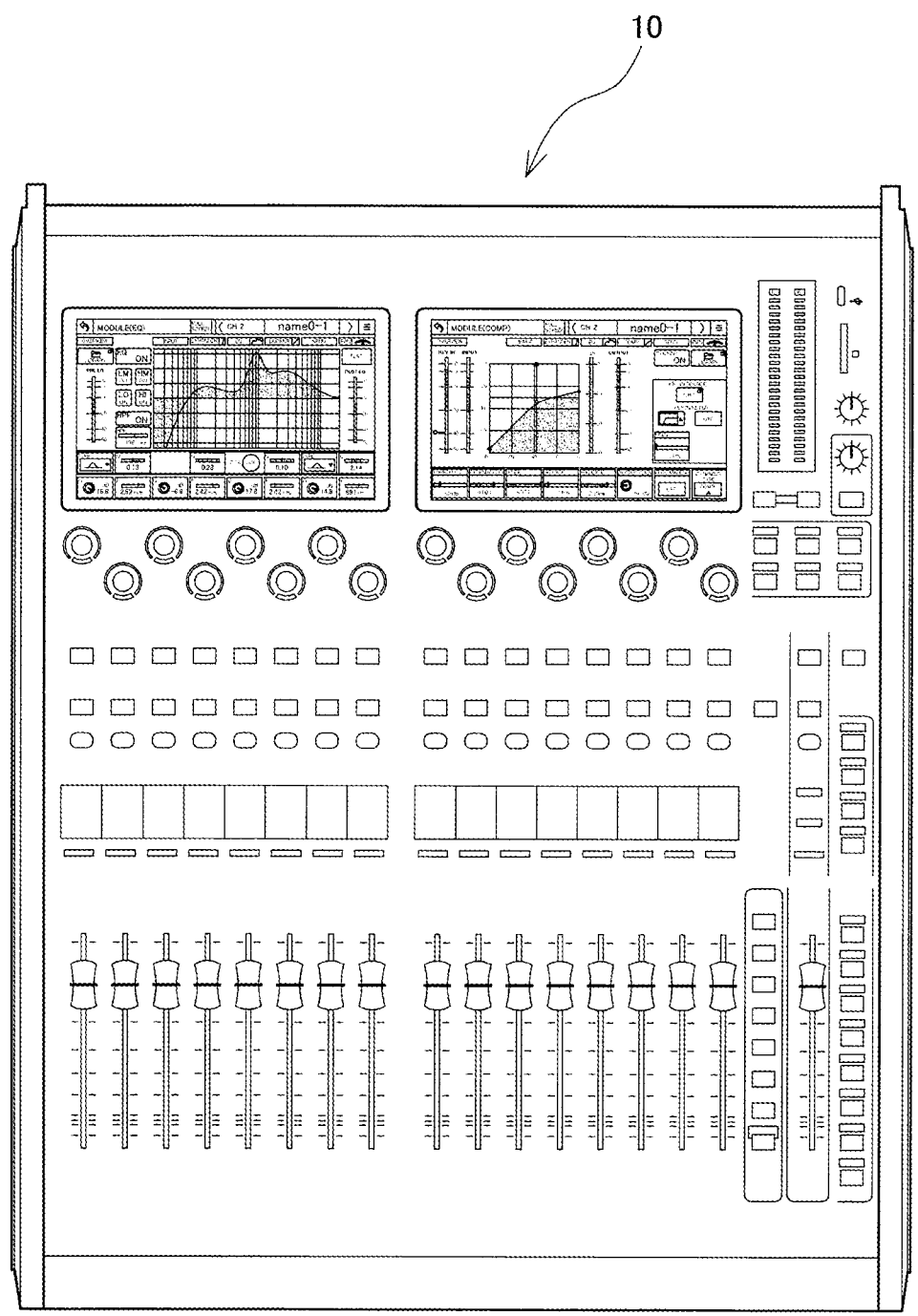
FIG. 9 is a diagram showing an example display when a user operates a full-screen button displayed on the display to an ON state in the state shown in FIG. 7.

FIG. 9 shows an example display in which the user operates the full-screen button 26 displayed on the display A 20 to the ON state in the state shown in FIG. 7. For the screen of the display A 20, the parameter setting screen of the equalizing process of the audio signal of CH2 is maintained, but the screen of the display B 21 is switched from the parameter setting screen of the gate process of the audio signals assigned to CH10-11 to the parameter setting screen of the compression process of the audio signal of CH2.

Figure 10A:
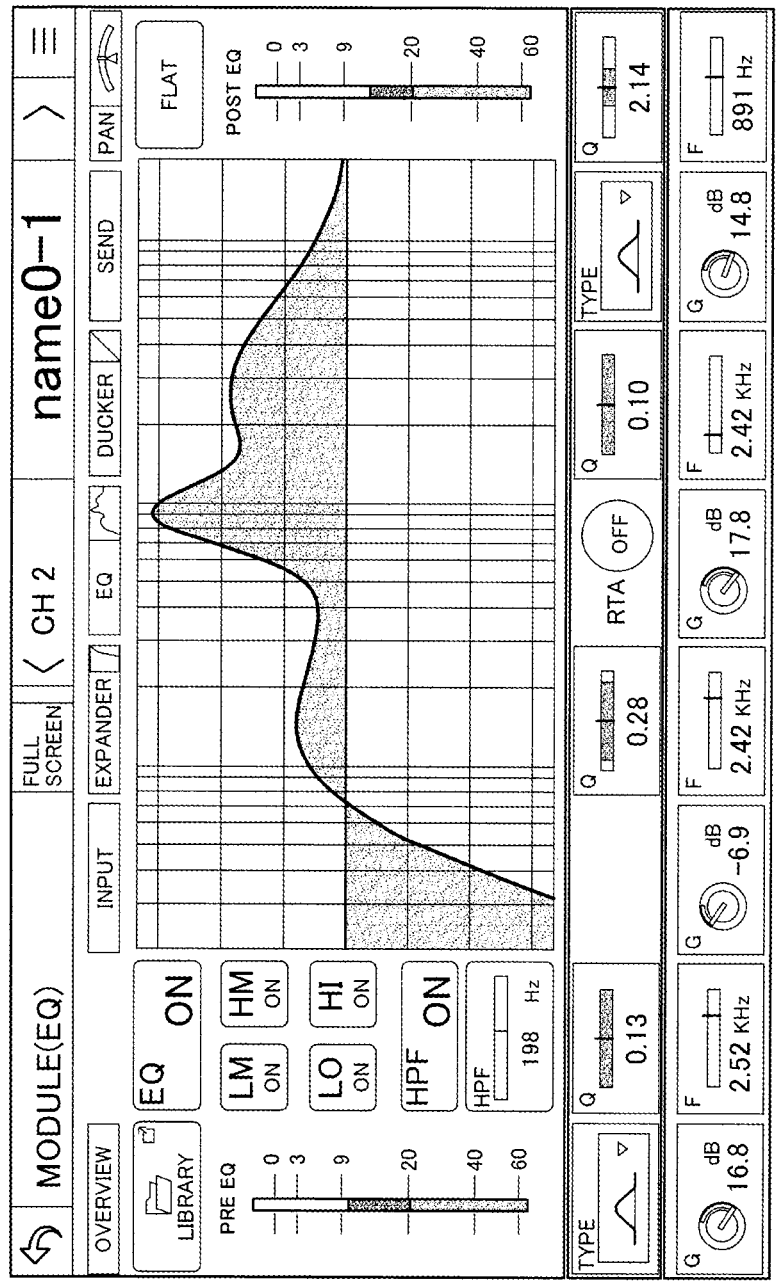
FIG. 10A is an enlarged view of one of the displays of FIG. 9.
Figure 10B:
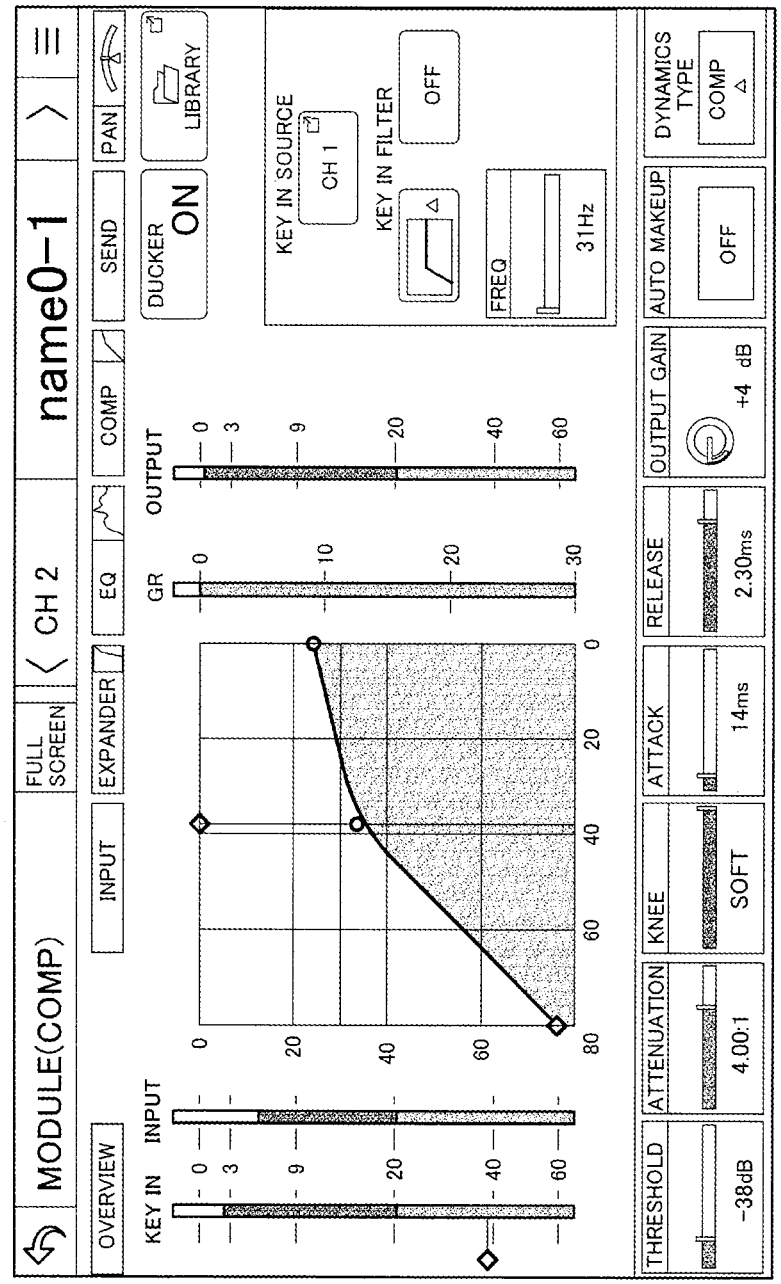
FIG. 10B is an enlarged view of the other of the displays of FIG. 9.

FIGS. 10A and 10B respectively show an enlarged view of the display A 20 of FIG. 9 and an enlarged view of the display B 21 of FIG. 9. FIG. 10A shows the screen of the display A 20, which is the parameter setting screen of the equalizing process of the audio signal of CH2. FIG. 10B shows a screen of the display B 21, which is the parameter setting screen of the compression process (COMP) of the audio signal of the same channel, CH2. Parameters of the compression process include a threshold, a ratio (RATIO), an attack (ATTACK), a knee (KNEE), or the like. The knee (KNEE) is a parameter for setting how the sound is bent at a boundary with the threshold when the sound exceeding the threshold is compressed.

In this manner, because different parameter setting screens of the audio signal of the same channel, CH2, are displayed on the display A 20 and the display B 21, the user can simultaneously set parameters of two processes (in this case, the parameters of the equalizing process and the parameters of the compression process) of the audio signal of CH2 using not only the display A 20, but also the display B 21.

In the state illustrated in FIG. 9, when the user operates the "input level" from the process menu 28 of the display B 21, the screen of the display B 21 is switched to the parameter setting screen of the input level. When the user operates "DUCKER" of the process menu 28, the screen of the display B 21 is switched to the parameter setting screen of "DUCKER". In either case, the user can simultaneously set parameters of two processes for the audio signal of CH2.

In the state illustrated in FIG. 9, when the user operates a channel change button (a portion of the figure displayed as "<CH2") displayed at the upper part of the screen, to change the channel, the screens of the display A 20 and the display B 21 are switched to the parameter setting screens of the audio signal of the channel to which the user has changed.

Figure 11:
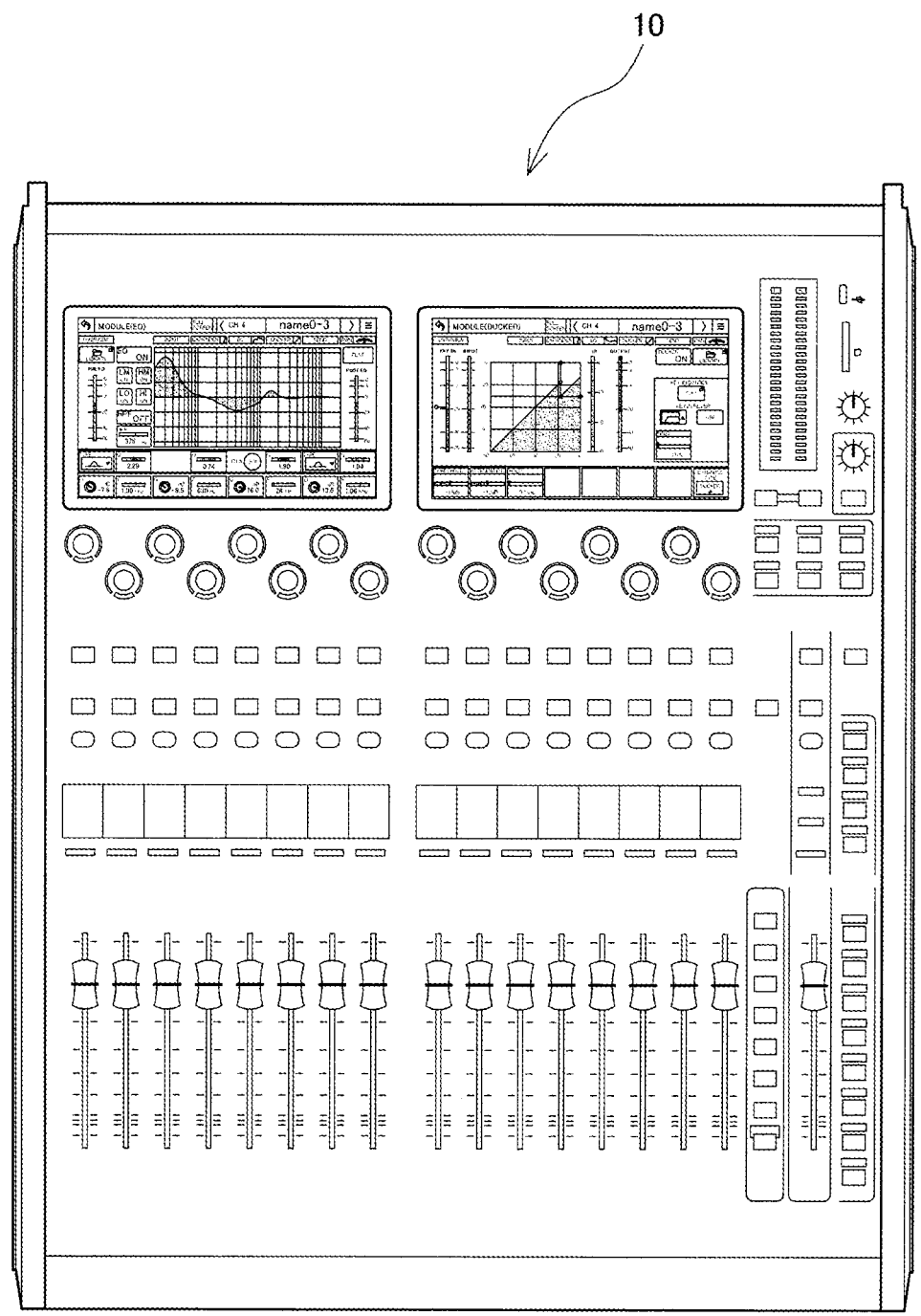
FIG. 11 is a diagram showing an example display when a user operates a channel change button displayed at an upper part of a screen of the display in the state of FIG. 9.
Figure 12A:
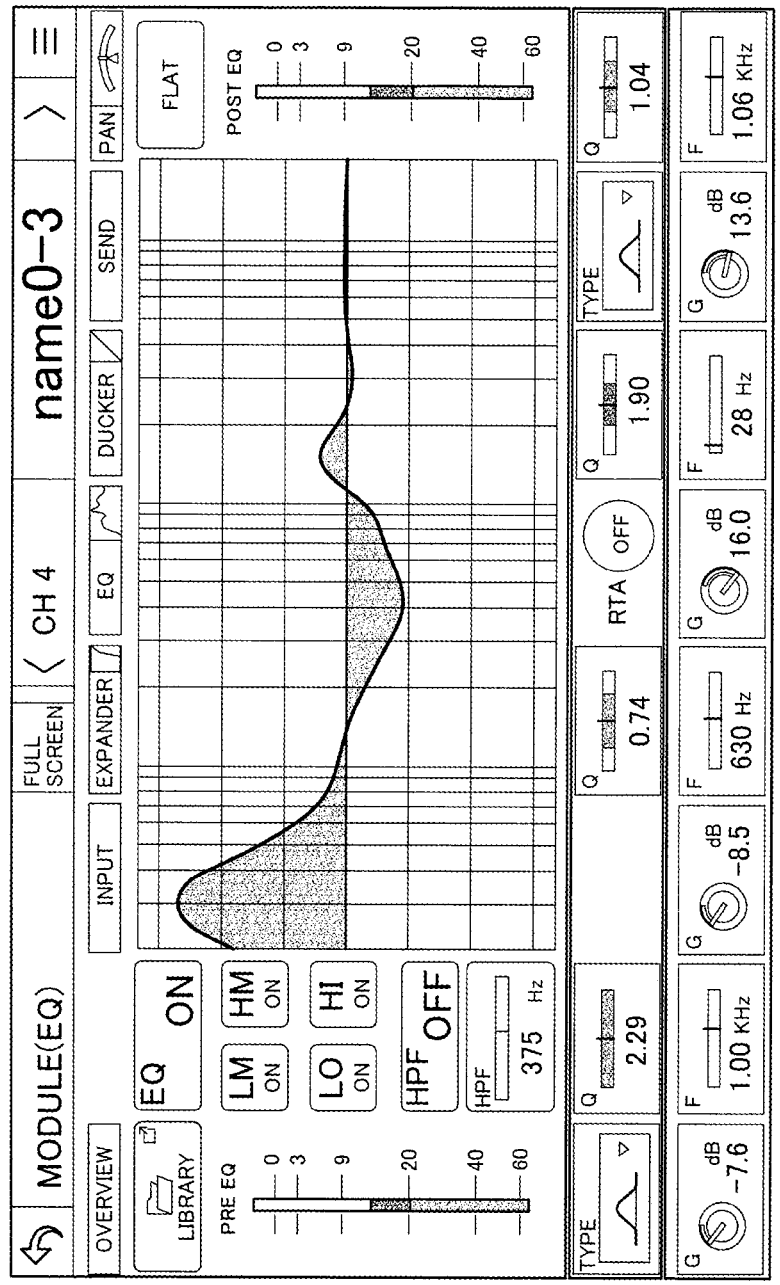
FIG. 12A is an enlarged view of one of the displays of FIG. 11.
Figure 12B:
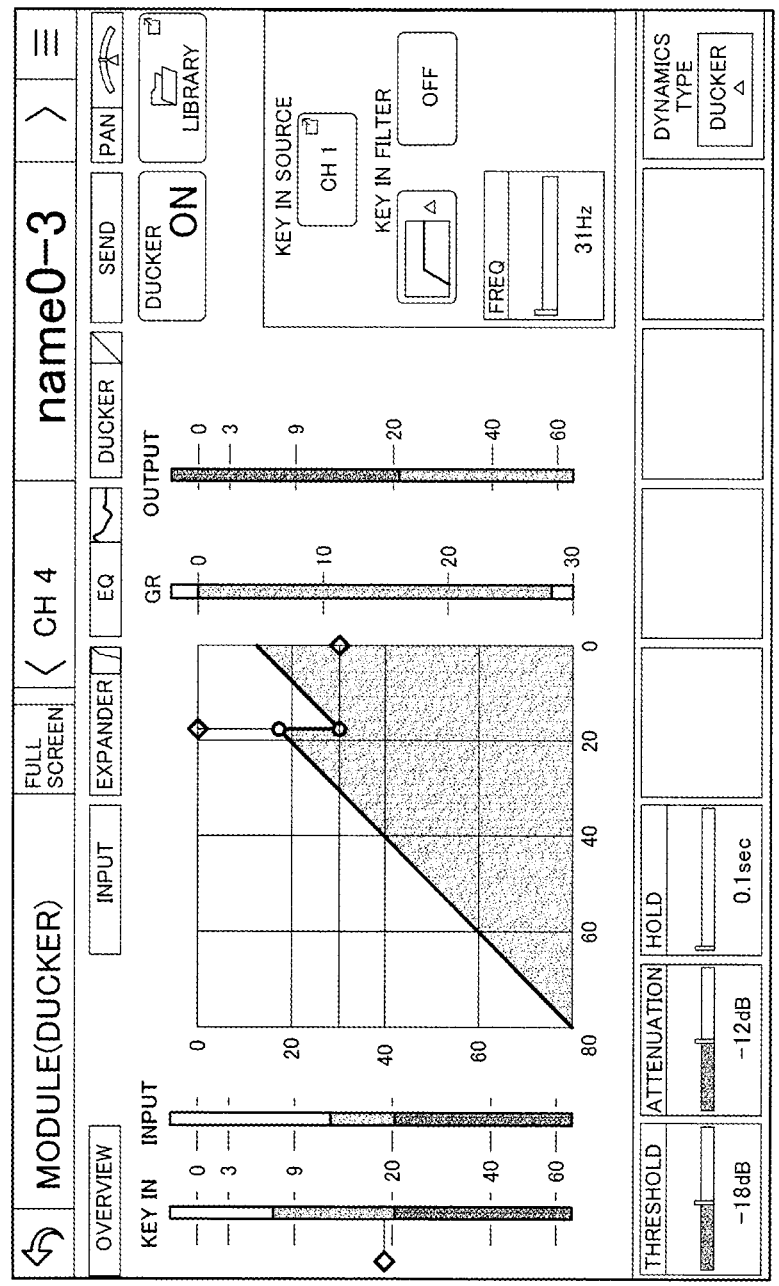
FIG. 12B is an enlarged view of the other of the displays of FIG. 11.

FIG. 11 shows an example display when the user operates the channel change button displayed at the upper part of the screen of the display A 20 in the state illustrated in FIG. 9, to change the channel from CH2 to CH4. FIGS. 12A and 12B respectively are an enlarged view of the display A 20 in FIG. 11, and an enlarged view of the display B 21 in FIG. 11. FIG. 12A shows the screen of the display A 20, which is the parameter setting screen of the equalizing process (EQ) of an audio signal of CH4. FIG. 12B shows the screen of the display B 21, which is the parameter setting screen of the DUCKER process of the audio signal of CH4. That is, when the channel is changed while the full-screen button 26 is maintained in the ON state, the screen of the display A 20 is switched to the parameter setting screen of the audio signal of CH4 which is the channel after the change, and, at the same time, the screen of the display B 21 is switched in a linked manner with the display A 20 to a different parameter setting screen of the audio signal of CH4 which is the channel after the change. The user can simultaneously set parameters of two processes (in this case, the parameters of the equalizing process and the parameters of the DUCKER process) of the audio signal of CH4 using not only the display A 20, but also the display B 21.

In the state of FIG. 9, in the case where the user operates the select (SEL) button of any of the channel strips of the left-side block 30 also, the screens of the display A 20 and the display B 21 are switched to the parameter setting screens of the audio signal of the selected channel. This is similarly true for the case in which the user operates the selection button of any of the channel strips of the right-side block 32.

In addition, in the state of FIG. 9, when the user applies an operation to end the parameter setting screen on either of the display A 20 or the display B 21, the screens of the display A 20 and the display B 21 are both switched from the respective parameter setting screen to the home screen. That is, when the full-screen button 26 is in the ON state, if one of the displays is switched to the home screen, the remaining displays are also switched to the home screen in a linked manner.

Figure 13:
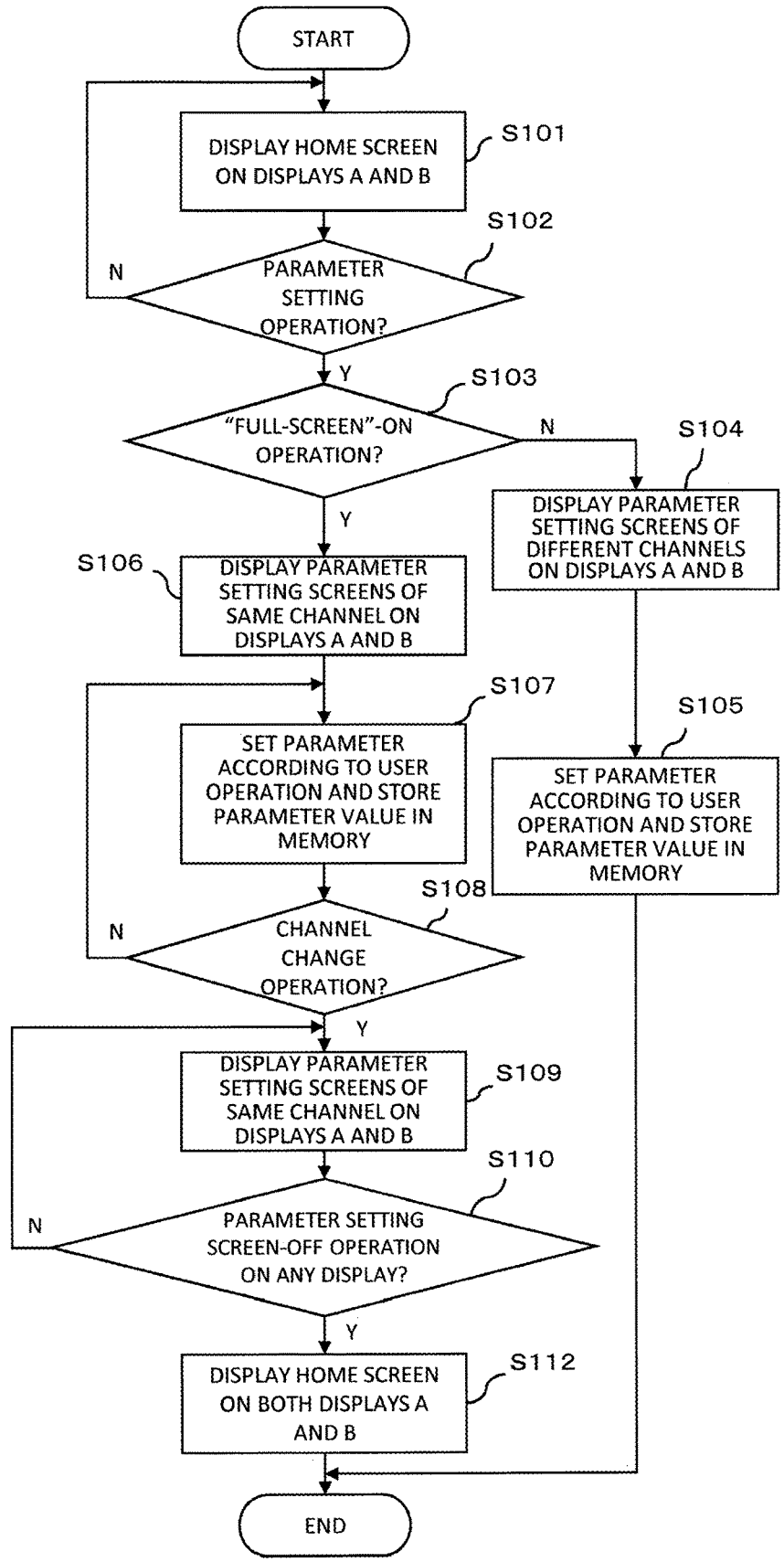
FIG. 13 is a process flowchart of one or more processors.

FIG. 13 shows a process flowchart of the one or more processors 14. The one or more processors 14 execute the process flowchart shown in FIG. 13 by reading and executing a process program.

The one or more processors 14 first cause the home screen to be displayed on the display A 20 and the display B 21 (S101).

Next, the one or more processors 14 judge whether or not a user operation of the parameter setting has been performed (S102). More specifically, the user operation of the parameter setting is determined when the user operates the selection (SEL) button of any of the channel strips.

When the user operation of the parameter setting is determined (YES in S102), the one or more processors 14 judge whether or not the full-screen button 26 is operated to the ON state (S103). In the default state, the full-screen button 26 is set at the OFF state, and, in the following, a state in which the full-screen button 26 is set at the OFF state will be referred to as a "normal mode (first mode)", and a state in which the full-screen button 26 is set to the ON state will be referred to as a "full-screen mode (second mode)".

When the full-screen button 26 is not operated to the ON state and the mode is thus the normal mode (NO in S103), the one or more processors 14 cause parameter setting screens of audio signals of different channels to be displayed on the display A 20 and the display B 21 (S104). That is, the parameter setting screen of the audio signal assigned to the channel strip of the left-side block 30 is displayed on the display A 20, and the parameter setting screen of the audio signal assigned to the channel strip of the right-side block 32 is displayed on the display B 21 (S104). Here, when the user operates only the selection (SEL) button of any of the channel strips of the left-side block 30, the parameter setting screen of the audio signal of the selected channel strip is displayed on the display A 20, but, on the display B 21, the home screen continues to be displayed. When the user sets various parameters using the parameter setting screen, the one or more processors 14 store the set parameter value in the memory 16 (S105). The stored parameter is used for the processing of the audio signal. For example, when the user sets various parameters of the equalizing process of the audio signal of CH2, the one or more processors 14 execute the equalizing process on the audio signal of CH2 using the parameter values which are set and stored in the memory 16.

On the other hand, when the full-screen button 26 is operated to the ON state (YES in S103), the one or more processors 14 transitions from the normal mode to the full-screen mode, and cause the parameter setting screens of the same channel to be displayed on the display A 20 and the display B 21 (S106). That is, the one or more processors 14 cause the parameter setting screen of a certain process to be displayed on the display A 20 and the parameter setting screen of a different process to be displayed on the display B 21. What combination of the parameter setting screens is to be displayed on the display A 20 and the display B 21 can be arbitrarily set by the user. The one or more processors 14 store, in the memory 16, the combination of display which is set by the user. The user simultaneously set the parameters of two processes of the same audio signal using the parameter setting screens displayed on the display A 20 and the display B 21 (S107).

Next, the one or more processors 14 judge whether or not a user operation for channel change has been executed (S108). When the user operation of the channel change has been executed on either the display A 20 or the display B 21 (YES in S108), the one or more processors 14 cause parameter setting screens of a channel after the change to be displayed on the display A 20 and the display B 21 (S109). That is, the one or more processors 14 cause the parameter setting screen of a certain process of the audio signal of the channel after the change to be displayed on the display A 20, and the parameter setting screen of a different process of the same audio signal to be displayed on the display B 21. When a channel change operation is executed on one of the displays, but is not executed on the other display, in the full-screen mode, the screens of both displays are switched to the parameter setting screens of the channel after the change.

Next, the one or more processors 14 judge whether or not a user operation for closing the parameter setting screen (OFF) has been executed (S110). When the user operation for closing the parameter setting screen has been executed on either the display A 20 or the display B 21 (YES in S110), the one or more processors 14 switch the display A 20 and the display B 21 to the home screen (S112). When the operation for closing the parameter setting screen is executed on one of the displays, but is not executed on the other display, in the full-screen mode, the screens of both displays are switched to the home screen.

In the parameter setting screen, as exemplified in FIGS. 12A and 12B, for example, the full-screen button 26 is always displayed on the upper part of the screen. Thus, the user can operate the full-screen button 26 to the OFF state at an arbitrary timing, to cause transition from the full-screen mode to the normal mode. Similarly, the user can cause transition from the normal mode to the full-screen mode at an arbitrary timing.

As described above, according to the present disclosure, the user can set parameters of processes of different audio signals by individually using the two displays, the display A 20 and the display B 21, of the digital mixer 10, and can also simultaneously set parameters of two processes of the same audio signal by simultaneously using the two displays, the display A 20 and the display B 21, as necessary. In other words, in the present disclosure, the mode can be switched by a simple operation between a mode in which parameter setting screens of different channels are individually displayed on two displays and a mode in which parameter setting screens of the same channel are displayed on the two displays in a linked manner. According to the present disclosure, an increase in the size of the digital mixer 10 can be suppressed, and a plurality of displays can be effectively utilized to efficiently set the parameters.

In the present disclosure, a configuration is exemplified in which the digital mixer 10 has two displays, the display A 20 and the display B 21, but the present disclosure is not limited to such a configuration, and configurations of three or more displays are also possible. For example, when the digital mixer has three displays, in the full-screen mode, the parameter setting screens of the same channel are displayed in a linked manner on the three displays, and the user can simultaneously set parameters of three processes (for example, the equalizing process, the gate process, and the compression process) for a certain audio signal.

The invention claimed is:

1. A digital mixer comprising:
    an input interface;
    one or more processors;
    an output interface; and
    at least a first display and a second display;
    wherein the one or more processors are configured, by reading and executing a program, to:
    cause a first parameter setting screen and a second parameter setting screen of different audio channels to be displayed respectively on the first display and the second display when a mode switching button for switching between a first mode and a second mode is set to the first mode;
    cause the first parameter setting screen and a third parameter setting screen to be displayed respectively on the first display and the second display when the mode switching button is set to the second mode, wherein the first parameter setting screen displayed by the first display is different from the third parameter setting screen displayed by the second display, wherein the first parameter setting screen and the third parameter setting screen respectively each set different parameters of a single audio channel, and wherein the first parameter setting screen, the second parameter setting screen, and the third parameter setting screen do not overlap when displayed; and
    process an audio signal input from the input interface using at least one parameter set in one or more of the first parameter setting screen, the second parameter setting screen, or the third parameter setting screen, and output a processed signal from the output interface.

2. The digital mixer according to claim 1, wherein
the one or more processors are configured, by reading and executing the program, to:
cause a state of a first audio signal assigned to a first channel strip to be displayed on the first display and cause a state of a second audio signal assigned to a second channel strip to be displayed on the second display when the mode switching button is set to the first mode; and
cause a state of one of the first audio signal assigned to the first channel strip and the second audio signal assigned to the second channel strip to be displayed on the first display and the second display when the mode switching button is set to the second mode.

3. The digital mixer according to claim 1, wherein
the first mode is a normal mode and the second mode is a full-screen mode,
the mode switching button is set to the normal mode in a default state; and
the one or more processors are configured, by reading and executing the program, to:
cause a home screen to be displayed on the first display and the second display; and
cause the first parameter setting screen and the second parameter setting screen of the different audio channels to be displayed respectively on the first display and the second display when a user operation of parameter setting is performed and the mode switching button is not operated, and cause the first parameter setting screen and the third parameter setting screen of the single audio channel to be displayed respectively on the first display and the second display when the user operation of parameter setting is performed and the mode switching button is operated to an ON state.

4. The digital mixer according to claim 3, wherein
the one or more processors are configured, by reading and executing the program, to:
cause, in a state in which the mode switching button is operated to the ON state and the first parameter setting screen and the third parameter setting screen of the single audio channel are displayed respectively on the first display and the second display, when a first one of the first display and the second display returns to the home screen in response to a user operation, a second one of the first display and the second display to return to the home screen in a linked manner.

5. The digital mixer according to claim 1, wherein
the one or more processors are configured, by executing the program, to: store in a memory a combination of the different parameters of the single audio channel displayed on the first display and the second display in the second mode.

6. The digital mixer according to claim 5, wherein
the one or more processors are configured, by executing the program, to: store in the memory the combination of the different parameters displayed on the first display and the second display in the second mode in a previous time, as the combination of the different parameters of the single audio channel displayed on the first display and the second display in the second mode.

7. The digital mixer according to claim 1, wherein
the mode switching button is displayed as a touch button on the first display and the second display,
the touch button displays a current mode state, and
switching between the first mode and the second mode results from a touch operation of the touch button.

8. The digital mixer according to claim 1, wherein
the at least one parameter is for at least one of an equalizing process, a gate process, or a compression process.

* * * * *